(12) United States Patent
Gschwind

(10) Patent No.: US 9,063,759 B2
(45) Date of Patent: Jun. 23, 2015

(54) OPTIMIZING SUBROUTINE CALLS BASED ON ARCHITECTURE LEVEL OF CALLED SUBROUTINE

(75) Inventor: Michael K. Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 13/432,393

(22) Filed: Mar. 28, 2012

(65) Prior Publication Data

US 2013/0263153 A1  Oct. 3, 2013

(51) Int. Cl.
*G06F 9/44*  (2006.01)
*G06F 9/445*  (2006.01)

(52) U.S. Cl.
CPC .......... *G06F 9/44521* (2013.01); *G06F 9/4425* (2013.01)

(58) Field of Classification Search
None
See application file for complete search history.

(56) References Cited

U.S. PATENT DOCUMENTS

| | | | |
|---|---|---|---|
| 6,317,870 B1 | 11/2001 | Mattson, Jr. | |
| 6,321,275 B1 * | 11/2001 | McQuistan et al. | 719/330 |
| 7,533,388 B1 | 5/2009 | Cavanaugh | |
| 2006/0059195 A1 * | 3/2006 | Hall et al. | 707/103 Y |
| 2007/0174819 A1 | 7/2007 | Li et al. | |
| 2008/0127143 A1 * | 5/2008 | Lagergren | 717/148 |
| 2010/0077378 A1 | 3/2010 | Maguire et al. | |

FOREIGN PATENT DOCUMENTS

| | | |
|---|---|---|
| CN | 1710547 A | 12/2005 |
| CN | 102346710 A | 2/2012 |
| JP | 2005352891 A | 12/2005 |
| JP | 2006092167 A | 4/2006 |

OTHER PUBLICATIONS

Patrick J. Meaney, Scott B. Swaney, Pia N. Sanda, Senior Member, IEEE, and Lisa Spainhower, Member, IEEE, "IBM z990 Soft Error Detection and Recovery," IEEE Tarnsactions on Device and Materials Reliability, vol. 5, No. 3, Sep. 2005, 9 pages.
IBM, [online]; retrieved from the Internet http://www.ip.com/pubview/IPCOM000146643D. "Using a mechanism of dynamically created stubs for invoking the methods and properties of the classes unknown until runtime," Feb. 19, 2007/pp. 1-2.
International Search Report dated Jul. 4, 2013 for Application No. PCT/IB2013/050959.

* cited by examiner

*Primary Examiner* — H S Sough
*Assistant Examiner* — Carina Yun
(74) *Attorney, Agent, or Firm* — Cantor Colburn LLP; William A. Kinnaman, Jr.

(57) ABSTRACT

A technique is provided for generating stubs. A processing circuit receives a call to a called function. The processing circuit retrieves a called function property of the called function. The processing circuit generates a stub for the called function based on the called function property.

13 Claims, 12 Drawing Sheets

OPTIMIZING SUBROUTINE CALLS BASED ON ARCHITECTURE LEVEL OF CALLED SUBROUTINE

BACKGROUND

The present invention relates generally to runtime optimization, and more specifically, to optimizing subroutine calls to a called subroutine.

In computer science, a subroutine (also known as a procedure, function, routine, method, or subprogram) is a portion of code within a larger program that performs a specific task and is relatively independent of the remaining code. As the name "subprogram" suggests, a subroutine behaves in much the same way as a computer program that is used as one step in a larger program or another subprogram. A subroutine is often coded so that it can be started ("called") several times and/or from several places during a single execution of the program, including from other subroutines, and then branch back (return) to the next instruction after the "call" once the subroutine's task is done.

In computing, a system call is how a program requests a service from an operating system's kernel. This may include hardware related services (e.g. accessing the hard disk), creating and executing new processes, and communicating with integral kernel services (like scheduling). System calls provide the interface between a process and the operating system (e.g., the kernel). The kernel is the main component of most computer operating systems; it is a bridge between applications and the actual data processing done at the hardware level. The kernel's responsibilities include managing the system's resources (the communication between hardware and software components). Usually as a basic component of an operating system, a kernel can provide the lowest-level abstraction layer for the resources (especially processors and I/O devices) that application software must control to perform its function. The kernel typically makes these facilities available to application processes through inter-process communication mechanisms and system calls.

In computer software, an application binary interface (ABI) describes the low-level interface between an application program and the operating system or between the application program and another application. The ABI cover details such as data type, size, and alignment; the calling conventions which controls how function arguments are passed and how return values are retrieved; the system call numbers and how an application should make system calls to the operating system; and in the case of a complete operating system ABI, the binary format of object files, program libraries and so on. Several ABIs (e.g., the Interactive Unix ABI allowing a wide range of programs to run on a variety of Unix and Linux® variants for the Intel x86 architecture) allow an application program from one operating system (OS) supporting that ABI to run without modifications on any other such system, provided that necessary shared libraries are present, and similar prerequisites are fulfilled.

The program development cycle of a typical application program includes writing source code, compiling the source code into object files, building shared libraries, and linking of the object files into a main executable program. Additional preparation, including loading of the main executable program, and loading of the shared libraries for application start-up occurs before the application is executed on a particular hardware platform.

The compiler works on a single source file (compile unit) at a time to generate object files. The complier generates object code without knowing the final address or displacement of the code/data. Specifically, the compiler generates object code that will access a TOC (table of contents) for variable values without knowing the final size of the TOC or offsets/addresses of various data sections. Placeholders (i.e., stubs) for this information are left in the object code and updated by the linker. A TOC is a variable address reference table that is utilized, for example in an AIX environment, to access program variables in a manner that supports shared libraries and is data location independent. A similar structure, referred to as a global offset table (GOT) performs a similar function (e.g., indirect and dynamically relocatable access to variables) in a Linux® environment. One difference between a TOC and a GOT is that a TOC may contain actual data, where a GOT only contains addresses (pointers) to data. In the Linux® PowerPC® 64-bit environment the TOC contains the GOT section plus small data variables.

The linker collects object files into executable programs/shared objects and assigns offsets to code/data. The linker resolves internal references during program development and external references are resolved at load time. The linker collects the TOC entries from object files, assigns TOC offsets, and generates the TOC section. The linker knows the final size of the TOC but does not perform major edits to TOC access code sequences generated by the compiler. The linker knows the offsets for specific internal reference TOC entries but does not know the final resolved values for most external reference TOC entries. The external reference TOC entries are resolved by the loader/dynamic linker.

"Power ISA™ Version 2.06 Revision B" published Jul. 23, 2010 from IBM® and incorporated by reference herein in its entirety teaches an example reduced instruction set computer (RISC) instruction set architecture (ISA). The Power ISA will be used herein in order to demonstrate example embodiments. However, the invention is not limited to Power ISA™ or RISC architectures. Those skilled in the art will readily appreciate use of the invention in a variety of architectures.

"z/Architecture Principles of Operation" SA22-7832-08, Ninth Edition (August, 2010) from IBM® and incorporated by reference herein in its entirety teaches an example CISC (complex instruction set computer) instruction set architecture.

"64-bit PowerPC ELF Application Binary Interface Supplement 1.9" (2004) from IBM and incorporated by reference herein in its entirety describes the 64-bit supplement to the PowerPC® Executable and Linking Format (ELF) ABI.

"Power Architecture® 32-bit Application Binary Interface Supplement 1.0 Linux®" (Apr. 19, 2011) and "Power Architecture® 32-bit Application Binary Interface Supplement 1.0-Embedded" (Apr. 19, 2011) are incorporated by reference herein in their entirety describe the 32-bit ABI.

SUMMARY

Embodiments include a method, system, and computer program product for generating stubs. A processing circuit receives a call to a called function. The processing circuit retrieves a called function property of the called function. The processing circuit generates a stub for the called function based on the called function property.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments provide a mechanism for a secure runtime optimization of external module subroutine calls based on called function properties, such as architecture levels, ability to call a subroutine with a near (short displacement branch), and location of a target subroutine in a module. In accordance with exemplary embodiments, customized stubs are generated at runtime when a function is first called as part of the dynamic linkage capability. The dynamic linker inspects the function being called, and generates an optimized stub based on properties such as but not limited to local module call versus external module call, near-distance call versus far call, and the need to configure an execution environment (i.e., initialize addresses) for the called function as a part of the stub. In one implementation, stubs are generated as an operating system module to ensure execution security. Concurrent stub updates are performed atomically to ensure safety relative to multithreaded execution.

Today, calls to external functions require a "stub" to be executed. This stub generation is common to operating systems supporting shared libraries, whether proprietary operating systems like z/OS® and AIX (Advanced Interactive eXecutive) by IBM®, or open source operating systems like Linux®. For AIX® this stub is called "glink" and for Linux® this stub is called "PLTstub". Because properties of the function that is being linked to is not known at compile time and static link time, compilers and static linkers must generate a "worst case" stub that can provide all functions that any call to an external function may ever need, including setting up of an environment (i.e., address initialization) and performing a "far" register indirect call.

However, in an embodiment, once the target (e.g., the called function) is known, a register indirect call could be substituted with a "near" pc-relative jump, which avoids branch misprediction and other penalties. Similarly, when new code having an enhanced architecture is called, some setup such as a TOC (table of content) pointer load can be avoided to take advantage of enhanced architecture and ABI (application binary interface) definition. These properties are unknown at compile and static link time, because the function being linked to is unknown. ABI is a specification for a specific hardware platform combined with the operating system. It is one step beyond the application program interface (API), which defines the calls from the application to the operating system. The ABI defines the API plus the machine language for a particular central processing unit (CPU) family.

Figure 1:
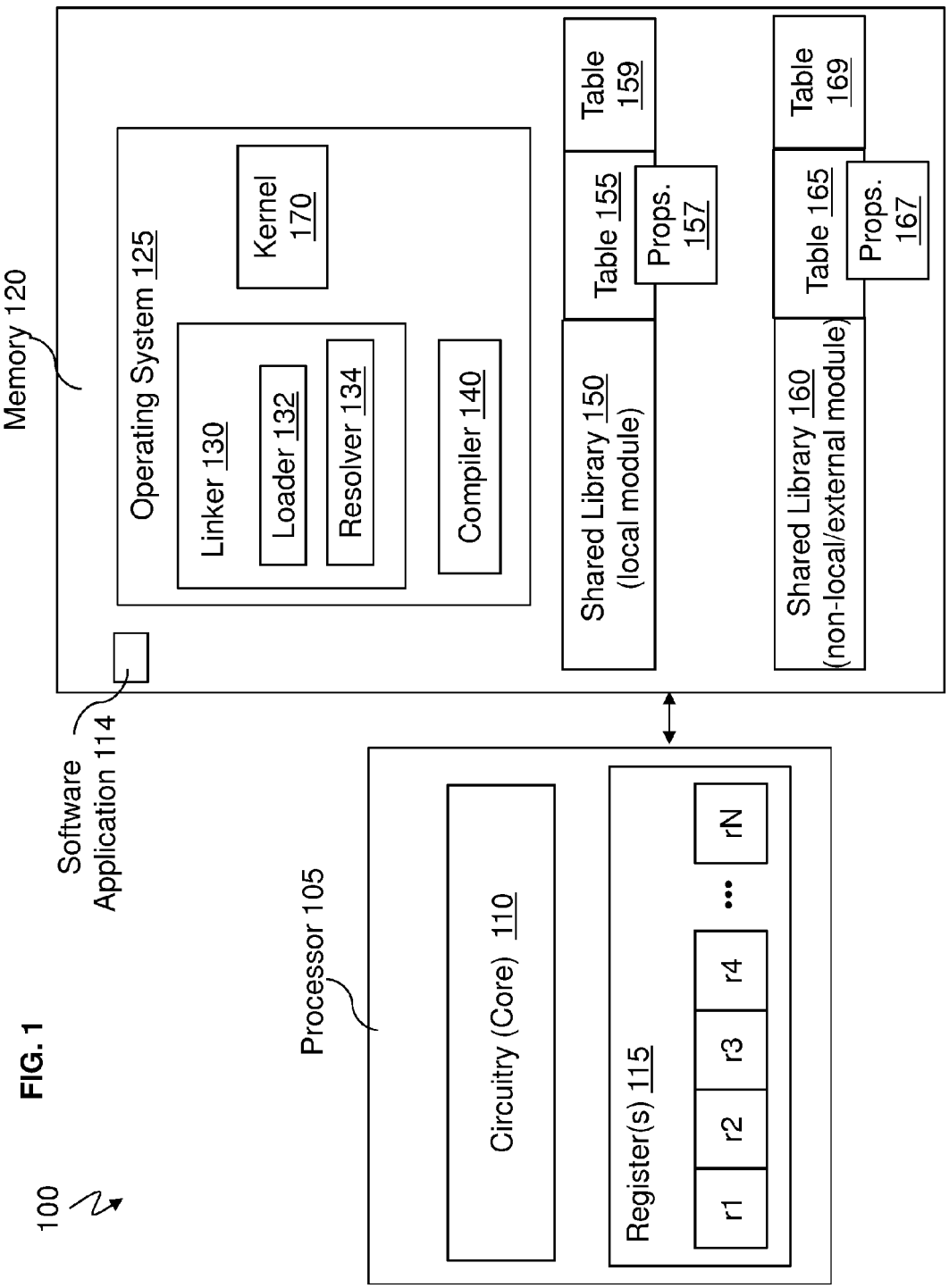
FIG. 1 is a block diagram of a computer system generally shown in accordance with an embodiment.

Turning now to FIG. 1, a block diagram of a computer system 100 is generally shown according to an embodiment. The computer system 100 includes a processor 105 also referred to as a central processing unit (CPU). The processor 105 has one or more processor cores, and the processor core may be referred to as circuitry 110. The processor 105 may include one or more registers 115. In computer architecture, a processor register is a small amount of storage available as part of a CPU or other digital processor, and data can be loaded into the register 115 from memory 120 for arithmetic manipulation by the circuitry 110. The registers 115 are individually labeled as register 1 (r1) through register N (rN).

The memory 120 may include one or more software applications 114 with program logic to perform the various operations as discussed herein. The memory 120 may include operating system (OS) 125 as an operating system for running the computer system 100. The operating system 125 may include a dynamic linker 130 with a loader 132 and a resolver 134. The dynamic linker 130 is the part of the operating system 125 that loads (via the loader 132) and links (via the resolver 134) shared libraries (e.g., shared library 150) for an executable (e.g., instructions of, e.g., the software application 114) when the executable is executed. The specific operating system and executable format determine how the dynamic linker functions and how it is implemented. Linking is often referred to as a process that is performed at compile time (by compiler 140) of the executable while a dynamic linker is in actuality a special loader that loads external shared libraries into a running process and then binds those shared libraries dynamically to the running process of the processor 105.

Figure 2:
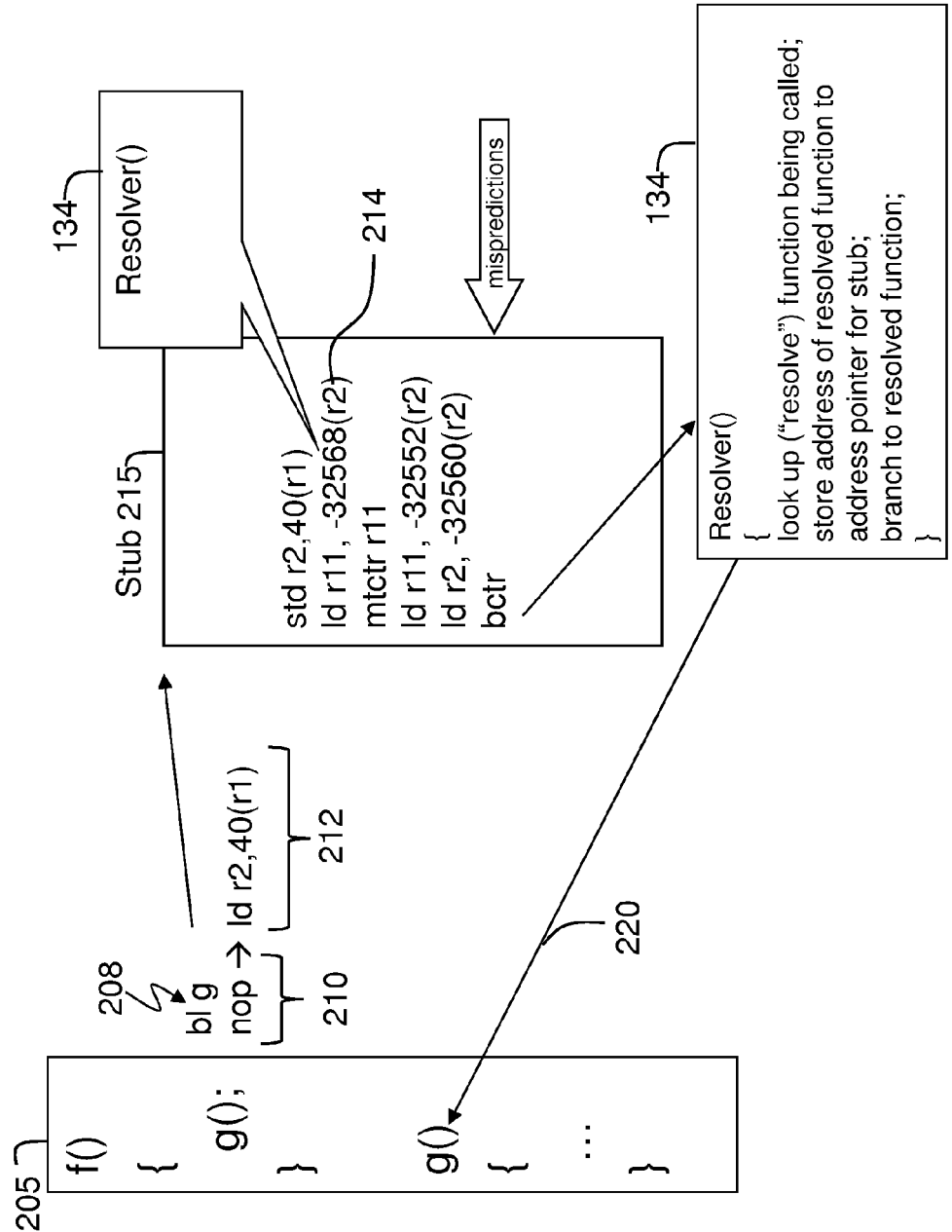
FIG. 2 is a block diagram illustrating an example of processing for a stub.

FIG. 2 is a block diagram 200 that illustrates an example of processing utilizing a stub in state of the art. A stub is a small program routine that substitutes for a longer program, possibly to be loaded later or that is located remotely. A stub may be used for a variety of reasons. For example, a method stub or simply stub in software development is a piece of code used to stand in for some other programming functionality (such as, e.g., a called function). A stub may simulate the behavior of existing code (such as a procedure on a remote machine) or be a temporary substitute for yet-to-be-developed code.

Figure 3:
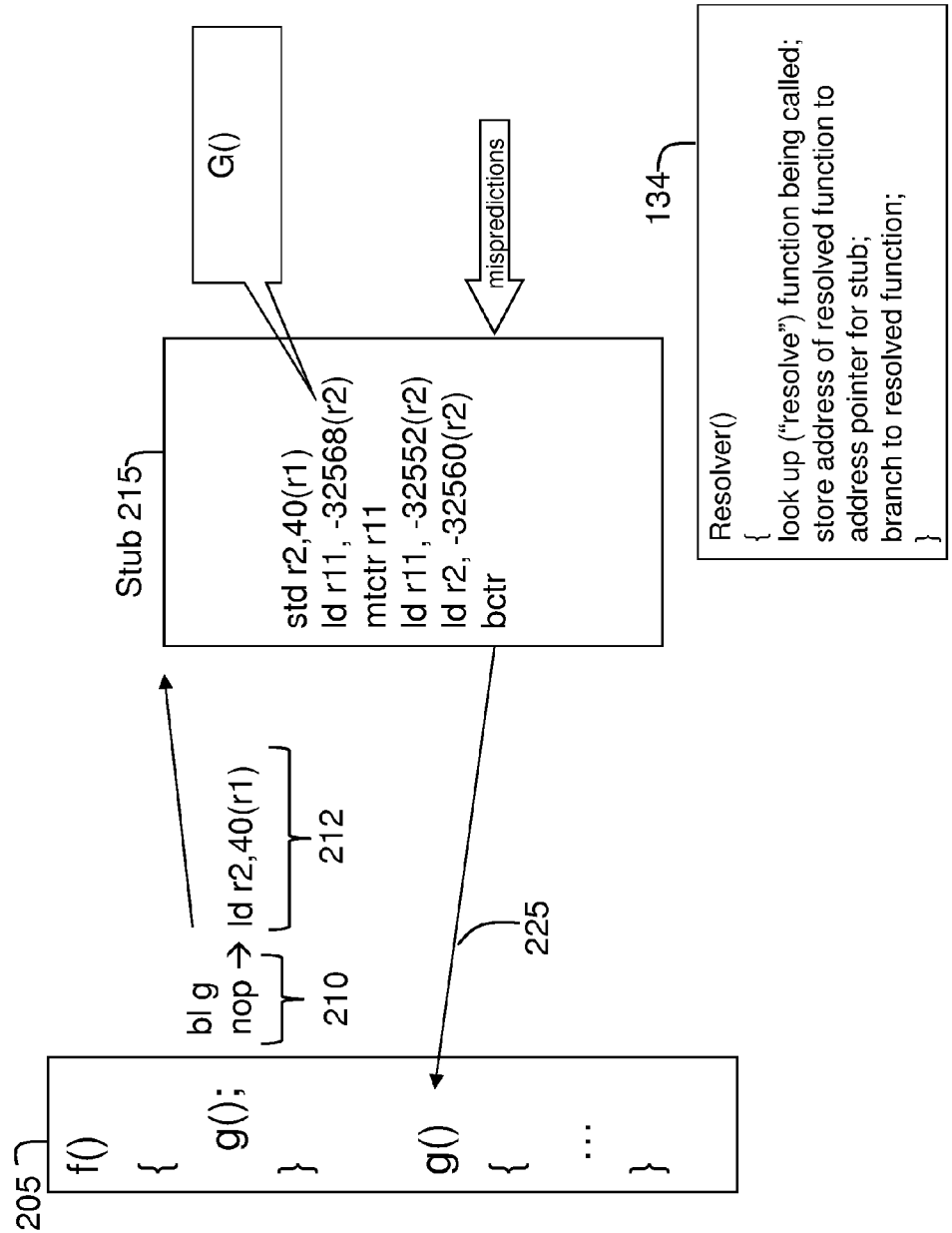
FIG. 3 is a block diagram illustrating an example of further processing for a stub.

In FIG. 2, it is assumed that a piece of code 205 is part of the software application 114. During compile time the compiler 140 processes the function f( ) calling the function g( ). Since the function g( ) is given in the piece of code 205, the compiler 140 generates the instructions 210 which is for a branch link to function g( ) by following the no operation (nop) instructions 210. The instructions 210 generated by the compiler 140 during compile time (initially) instruct the resolver 134 to resolve the called function g( ) (which was not provided in the piece of code 205 of the software application 114) by utilizing a stub 215. The stub 215 and load instruction 212 are generated by the static linker in accordance with one or more of the Power® ABIs. During runtime when performing dynamic linking, the resolver 134 is called (via load instruction 214) by the stub 215 (the resolver 134 corresponding to dynamic linker 130), and the address pointer corresponding to load instruction 214 is write-updated by resolver 134 to replace the contents of the corresponding data location with the address of the resolved function (and specifically "g( )" in the present example) so as to cause stub 215 to directly transfer control to function "g( )" upon future invocations. The resolver 134 performs name resolution to locate the address of the called function "g( )" and will eventually lead to the called function g( ) stored in the shared library 150 in an address pointer corresponding to load 214. The resolver 134 must first perform a look up in tables 155 and 165 to obtain the proper function g( ) and the address for the function g( ). The resolver 134 follows the six instructions (which may be five instructions in some operating systems as shown in stub 405) in the stub 215 to obtain and reach the called function g( ). The resolver 134 then provides (line 220) the subroutine for the called function g( ) to the piece of code 205. On subsequent executions of the piece of code 205, the subroutine for the called function g( ) will be used without requiring the resolver 134 to look up and determine (resolve) the function g( ) for the piece of code 205 as shown in FIG. 3. As seen in block diagram 300, the resolver 134 does not have to be called for subsequent occasions that the processor 105 processes the piece of code 205. Instead, the function g( ) is automatically called (obtained) from the shared library 150 in stub 215 using a branch to counter (bctr) instruction (line 225), because the dynamic linker 130 has linked the called function g( ) in the shared library 150 to the piece of code 205 calling the function g( ).

Initially, however, the five or six instructions of the stub 215 transfer control to the resolver 134. The instruction in stub 215 may include:

| |
|---|
| std r2,40(r1) |
| ld r11, −32568(r2) |
| mtctr r11 |
| ld r11, −32552(r2) |
| ld r2, −32560(r2) |
| bctr |

Specifically, the instructions in the stub perform the following function in accordance with the Power® ABI. For the first instruction, std r2,40(r1) stores the addressability register r2 for the address table base, so it may later be restored by instruction 212 after the return from the function. For the second instruction, ld r11, −32568(r2) loads the target address to be branches to by the stub. The value is stored in the GOT in accordance with Linux PLTstubs. In an alternate embodiment, the value is stored in a function descriptor in accordance with the AIX® glink stub. The value is initialized to the address of the resolver when execution starts, and updated to the target function for the stub by the resolver 134. For the third instruction, mtctr r11 moves the address loaded by the ld r11 instruction to the count register. For the fourth instruction, ld r11, −32552(r2) loads an addressability register which may be used in conjunction with libraries such as libffi or statically scoped languages. This instruction is optional. In the fifth instruction, ld r2, −32560(r2) loads the GOT address (for Linux PLTstubs) corresponding to the branches to function. For the sixth instruction, bctr branches to the address previously loaded into the count register.

Exemplary embodiments provide the resolver 134 which is configured to generate and use a different stub with fewer instructions in place of a stub (like the stub 215 or stub 405) without being required to perform five or six instructions.

FIGS. 2 and 3 showed an example of a PLT stub, which was stub 215. PLT stubs include code (i.e., instructions in stub 215) to handle worst case scenarios. This includes reload of the base pointer context for TOC (table of contents) or GOT (global offset table) addressing. Reloading the base pointer for TOC or GOT addressing is address initialization necessary when transferring control to a module not known to be the same module.

Also, PLT stubs obtain target address from TOC (which is a data structure such as the tables 155 and 165). Note that there are two different tables, the TOC(GOT) tables 159 and 169, and the resolver tables 155 and 165. The TOC/GOT table (such as 159 and 169) is used to find data. The "symbol table" (such as the tables 155 and 165) is used by the resolver 134 to find functions and their properties. This requires expensive load/mtctr/bctr sequence, and it may be difficult (at times) to predict ctr-based branching.

FIG. 1 shows the shared library 150 which is the local module for the calling function f( ). Reference to local module is to the shared library 150 that contains the calling function, which is the calling function f( ). The memory 120 may also have the shared library 160 which is an external (non-local) module that is external to the calling function f( ). The (external module) shared library 160 has its table 165 just as the (local module) shared library 150 has its table 155. Each table 155 (for shared library 150) and table 165 (for shared library 160) contains respective properties 157 and 167 for each of its functions. The shared library 150 has its TOC/GOT table 159 and the shared library 160 has its TOC/GOT table 169 in a Power® Architecture structure which contains addresses and data, as discussed in the "64-bit PowerPC ELF Application Binary Interface Supplement 1.9" (2004), "Power Architecture® 32-bit Application Binary Interface Supplement 1.0 Linux®" (Apr. 19, 2011), and "Power Architecture® 32-bit Application Binary Interface Supplement 1.0-Embedded" (Apr. 19, 2011) incorporated by reference herein in their entirety.

As discussed herein, the resolver 134 is configured make decisions for generating new stubs based on, e.g., whether the called function g( ) is in the local shared library 150 with the calling function f( ) and/or whether the called function is in the (external module) shared library 160 that is external to the local module (i.e., shared library 150) of the calling function f( ).

Figure 4:
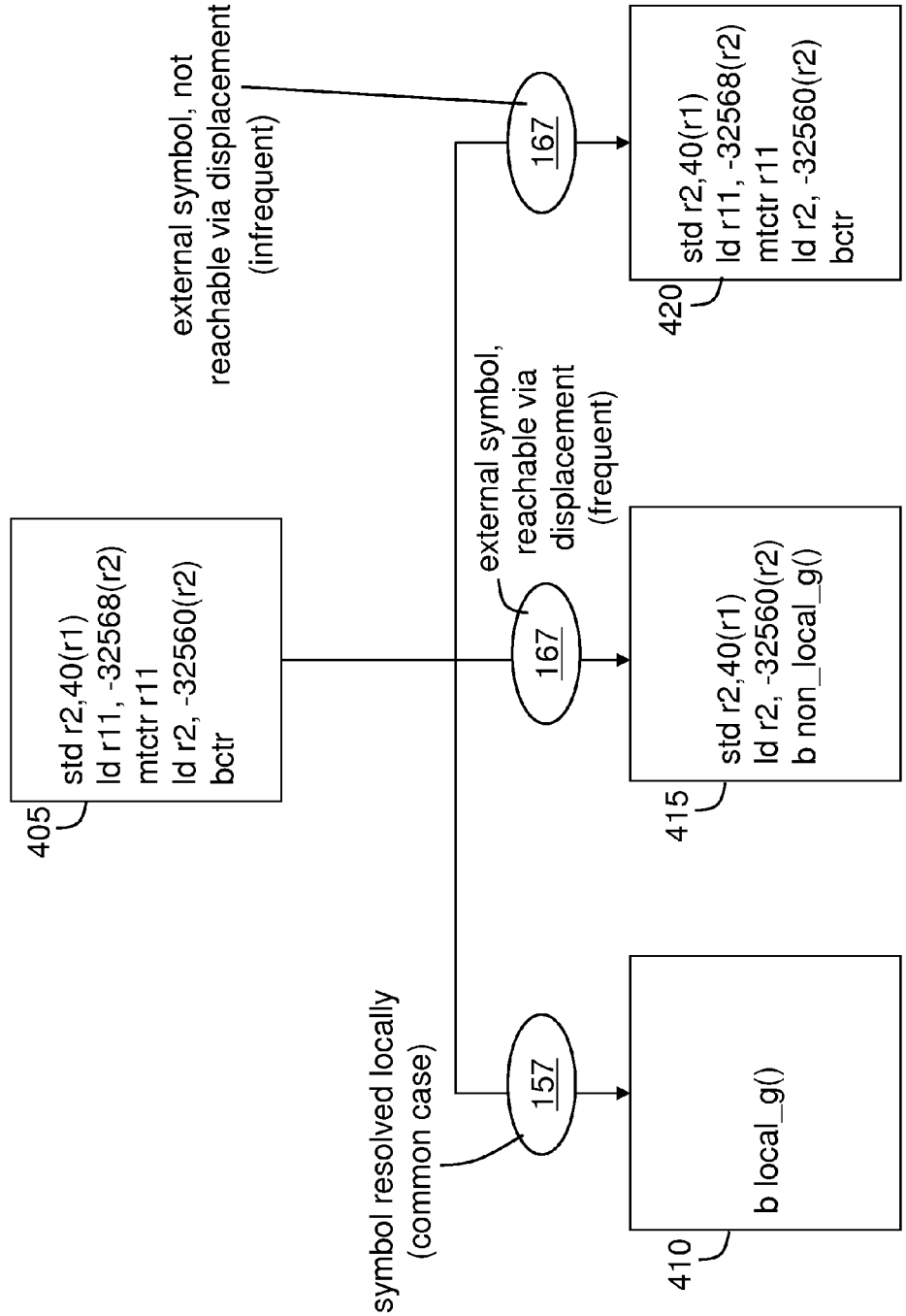
FIG. 4 is a block diagram illustrating generating various new stubs based on the properties of a particular function being called in accordance with an embodiment.

In embodiments, the dynamic linker 130 (particularly the resolver 134) is configured to perform runtime optimizations. FIG. 4 is a block diagram 400 of the resolver 134 (executing on the processor 105) to generate various new stubs based on the properties (e.g., in properties 157 and/or 167) of the particular function, such as the function g( ) being called according to an embodiment.

It has to be determined by the resolver 134 whether the properties of each respective function (including function g( )) are stored in the shared library 150 with its tables 155 and 159 and/or in the external shared library 160 with its tables 165 and 169. When a function (such as function g( )) is identified in a piece of code (such as the piece of code 205), the resolver 134 is configured to locate and read the properties for that called function g( ). Instead of automatically using the stub 215 in conjunction with function calls to go from code 205 which is shown as stub 405 in FIG. 4 with only five instructions, the resolver 134 is configured to generate a new stub based on the individual properties 157 of the called function.

Although not shown for conciseness, it is assumed that the piece of code 205 is included in FIG. 4 along with the call to the resolver 134 (e.g., by instructions 210 and 212). The resolver 134 does not automatically configure code 205 to execute the stub 405 now shown with five instructions (which was stub 215 with six instructions in FIGS. 2 and 3) to call another function, e.g., function g( ). A few example scenarios are discussed in FIG. 4 for conciseness, but it is understood that other scenarios do apply. As discussed in FIG. 2, it is assumed that the resolver 134 is tasked/called to resolve the function g( ) which was not included in the piece of code 205 of the software application 114.

In the first scenario, the resolver 134 looks up the function g( ) in the table 155 to find (the name of) the function g( ) along with the particular properties 157 of the function g( ). The resolver 134 is configured to read the properties 157 for function g( ), and the resolver 134 determines that the symbol (i.e., function g( )) can be resolved locally in the shared library 150. For example, the resolver 134 determines that the calling function f( ) and the called function g( ) are in the same local module which is the same local shared library 150. As such, the resolver 134 is configured with logic to generate stub 410, which is branch to local function g( ) in the shared library 150 (i.e., local module). This is a direct branch in the stub 410, and the resolver 134 is configured to execute the single instruction in the stub 410 in place of the more general stub 405 (designed for a worse case scenario with five instructions). Accordingly, the resolver 134 returns the subroutine for the function g( ) as discussed in FIGS. 2 and 3 and generates a stub 410 to directly invoke go without use of a more general stub 215 or 405.

In the second scenario, the resolver 134 looks up the function g( ) in the table 155 to find (the name of) the function g( ) but recognizes that the function g( ) is not in the shared library 150. Accordingly, the resolver 134 looks up the function g( ) in the table 165 to find (the name of) the function g( ) along with the particular properties 167 of the function g( ). The resolver 134 is configured to read the properties 167 for function g( ), and the resolver 134 determines that the function g( ) is an external symbol which is not in local module 150 (e.g., in non-local shared library 160) but the resolver 134 determine that the called function g( ) is reachable via branch displacement (i.e., a pc-relative branch) based on the properties 167. For example, the resolver 134 determines that the shared library 150 of the calling function f( ) and/or of the resolver 134 (which may be called from the shared library 150) is close by (i.e., pc-relative) the location of called function g( ). This means that the address location of the called function g( ) can be specified with less than 64 bits (such as a number of bits supported by a pc-relative branch) as an offset from the location of the calling function f( ) and/or the stub 405. Accordingly, the resolver 134 generates instructions for stub 415 to be used in place of the stub 405. Since the external symbol (function g( )) is pc-relative as determined by the resolver 134, this means that branch instructions (of stub 415) specify an offset/distance (in registers 115) from one memory location to another in memory 120. For example, the stub 415 may specify an offset from the pc-relative branch in stub 415 to the location of the called function g( ). Additionally, the resolver 134 via stub 415 can load r2 with the address table (such as a GOT or TOC table 169) base pointer for the module corresponding to function g( ) from the non-local shared library 160.

In the third scenario, the resolver 134 looks up the function g( ) in the table 155 to find (the name of) the function g( ) but recognizes that the function g( ) is not in the shared library 150. The resolver 134 can read the properties 167 for function g( ), and determine that the function (g) is an external symbol that is not reachable by displacement (not reachable by an offset distance used for a pc relative branch). As such, the resolver 134 would execute the instructions of stub 405 (also shown as stub 420) for the normal case.

Figure 5:
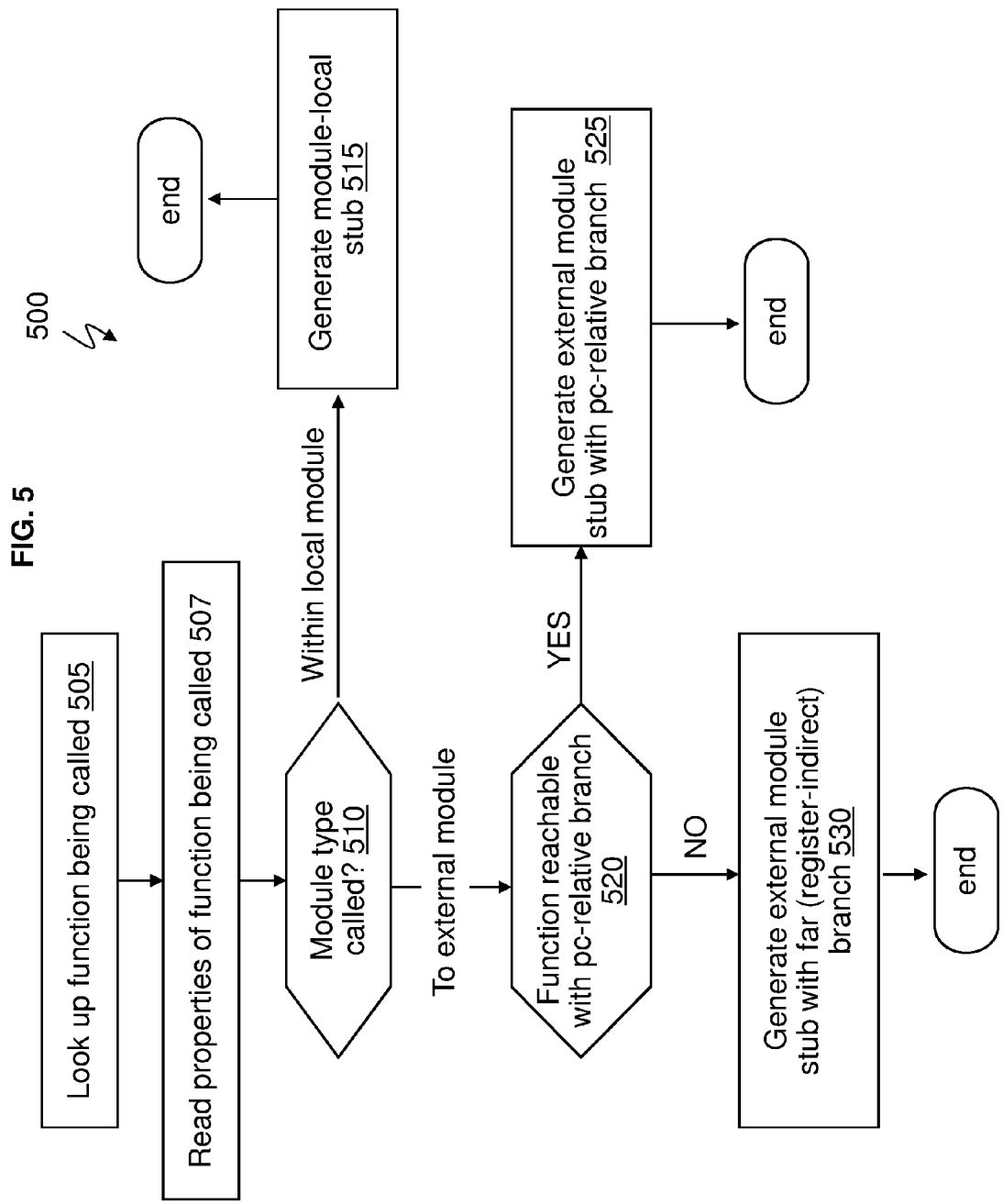
FIG. 5 is a flow chart illustrating a method for determining stubs to generate during runtime in accordance with an embodiment.

FIG. 5 is a flow chart illustrating a method 500 of the resolver 134 (running on the processor 105) determining stubs to generate during runtime according to an embodiment. As discussed in FIGS. 2, 3, and 4, it is assumed that the resolver 134 has been called to determine and locate a called function g( ) (which can represent any function being called). In a state-of-the art situation, the resolver 134 would be configured to operate in conjunction with instructions in stub 215 or 405, without generating a new stub based on the particular properties of the called function.

The resolver 134 is configured to look up the function g( ) being called at block 505 and read the properties 157 (local shared library 150) and/or read properties 167 (external shared library 160) for this particular function g( ) at block 507. Based on reading the particular properties 157 and/or 167 for the function g( ), the resolver 134 is configured to determine the type of module (e.g., local shared library 150 versus external shared library 160) being called at block 510. When the resolver 134 determines that the module type of the function g( ) is a local module (which is the same module (i.e., shared library 150) as the calling function f( )), the resolver 134 is configured to generate a local module stub at block 515. Stub 410 is an example of a local module stub generated by the resolver 134 (when both the called and calling functions are in shared library 150).

When the resolver 134 determines that the module type of the function g( ) is an external module (i.e., the module (external shared library 160) of the called function g( ) is different from the module (i.e., local shared library 150) of the calling function f( )), the resolver 134 is configured to determine whether the called function g( ) is reachable with a local branch (which is a PC-relative branch) at block 520.

When the resolver 134 determines that the called function g( ) is reachable with a PC-relative branch, the resolver 134 is configured to generate an external module stub with a near branch (e.g., reachable by displacement) at block 525. Stub 415 is an example of an external module stub that is reachable via offset addressing from, e.g., the called function f( ) and/or the resolver 134 location.

When the resolver 134 determines that the called function g( ) is not reachable with a PC-relative branch (i.e., not reachable with a local branch), the resolver 134 is configured to generate an external module stub with a far (register-indirect) branch at block 530. An example of this stub is stub 215 and 405.

Figure 6:
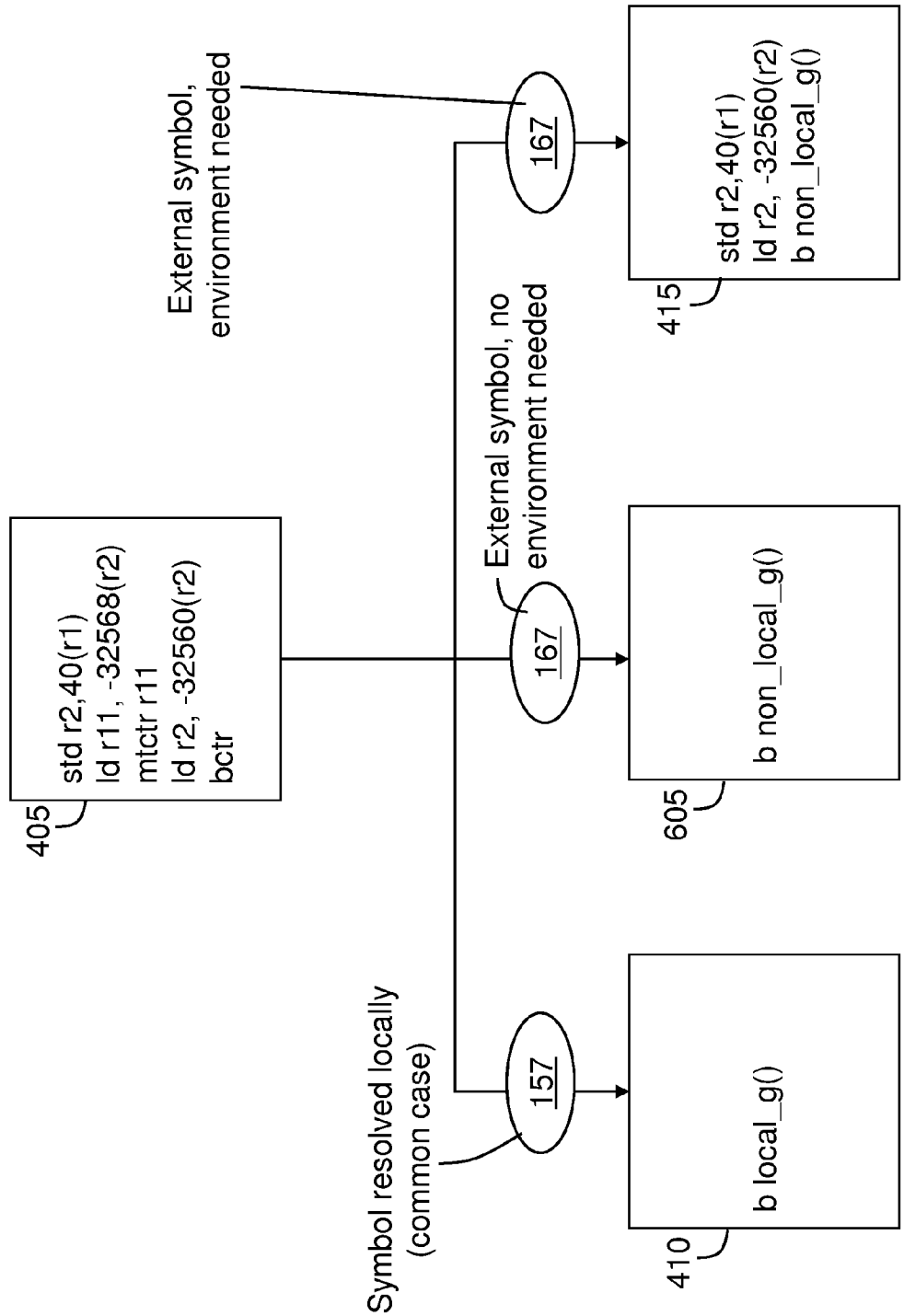
FIG. 6 is a block diagram that provides further stub generation tailoring in accordance with an embodiment.

Exemplary embodiments also provide optimization for environment setup requirements for the function being called. Setup of the environment means that addresses need to be initialized (by the resolver 134). For example, the loading of the TOC base or GOT pointer (i.e., addresses used to access the tables 159 and/or 169) is address initialization, which is initializing the address of the pointer. Address initialization refers to the act of loading an address into a base register (of registers 115) that may be used for the further addressing of instruction or data, e.g., such as loading the base address of a TOC structure, a GOT structure, or another base address into a base address register. Some ABIs require setup of environment prior to calling a function, and this represents overhead when the environment is not used such as when a global variable is not accessed (i.e., is not required). Many modern applications represent short functions that do not use environment. Improved architectures offer capability to use PC-relative accesses to avoid need to set up environment. In accordance with an embodiment, a property (in the properties 157 and/or 167) is associated with each function about whether an environment needs to be set up or not. This property (in the properties 157 and/or 167) can be indicated as a relocation type that is read by the resolver 134. Also, the resolver 134 can determine this property by scanning the code (of, e.g., the function g( )) being linked. As an additional optimization, FIG. 6 is a block diagram that provides further stub generation tailoring by the resolver 134 according an embodiment.

As previously discussed in FIG. 4, the resolver 134 has been called to generate a stub for the called function g( ) called by the calling function f( ) during runtime. FIG. 6 is similar to FIG. 4 except for the newly added stub 605 which is discussed further below. In FIG. 6, the resolver 134 is configured to search for the called function g( ) in the table 155 (corresponding to the local shared library 150) and find the properties 157 corresponding to the called function g( ). Based on the properties 157 for the called function g( ), the resolver 134 generates the stub 410 as in the FIG. 4.

In an additional scenario, the resolver 134 looks up the function g( ) in the table 155 to find (the name of) the function g( ) but recognizes that the function g( ) is not in the shared library 150. Accordingly, the resolver 134 looks up the function g( ) in the table 165 to find (the name of) the function g( ) along with the particular properties 167 of the function g( ). The resolver reads the properties 167 for the called function g( ) and determines that the called function g( ) is an external symbol (i.e., external to the module of the calling function f( )) that does not need the environment to be setup. That is, no address initialization (from table 169) is needed for this external symbol. In this case (which is unlike stub 415), the address initialization is not required and this removes two instructions (std r2,40(r1) and ld r2, −32560(r2)) from having to be processed. As such, the resolver 134 is configured to generate the stub 605. Unlike the stub 415, the stub 605 does not have to store r2 and load r2.

Those skilled in the art will understand that determination of whether address initialization is necessary can be based on a variety of factors. In one embodiment, information is recorded as a property in tables 157 and 167, e.g., as different relocation types in accordance with external symbol relocation information in accordance with an ABI, such as the Power® ABI of the Power Architecture® already incorporated herein by reference, or as an explicit property stored in a table. In another feature, different naming conventions can be used, e.g., by starting all symbol names not needing address initialization with a special symbol, such as $ (dollar) or _(underscore). In another embodiment, symbols needing address initialization are so marked. In yet another feature, an embodiment scans the object code of the called function to determine a need for address initialization. Those skilled in the art will be able to identify yet other means to convey such information to a resolver while practicing the teachings contained herein.

In another scenario, the resolver 134 looks up the function g( ) in the table 155 to find (the name of) the function g( ) but recognizes that the function g( ) is not in the shared library 150. Accordingly, the resolver 134 looks up the function g( ) in the table 165 to find (the name of) the function g( ) along with the particular properties 167 of the function g( ). The resolver 134 is configured to read the properties 167 for function g( ), and the resolver 134 determines that the function g( ) is an external symbol which is not in local module 150 (e.g., in non-local shared library 160) but the resolver 134 determine that the called function g( ) is reachable via branch displacement (i.e., a pc-relative branch) based on the properties 167. For example, the resolver 134 determines that the shared library 150 of the calling function f( ) and/or of the resolver 134 (which may be called from the shared library 150) is close by (i.e., pc-relative) the location of called function g( ). This means that the address location of the called function g( ) can be specified with less than 64 bits (such as a number of bits supported by a pc-relative branch) as an offset from the location of the calling function f( ) and/or the stub 405. Resolver 134 also determines that address initialization is necessary. Accordingly, the resolver 134 generates instructions for stub 415 to be used in place of the stub 405. Since the external symbol (function g( )) is pc-relative as determined by the resolver 134, this means that branch instructions (of stub 415) specify an offset/distance (in registers 115) from one memory location to another in memory 120. For example, the stub 415 may specify an offset from the pc-relative branch in stub 415 to the location of the called function g( ). Additionally, the resolver 134 via stub 415 stores a prior address pointer from r2 into memory and loads r2 with the address table (such as a GOT or TOC) base pointer for the module corresponding to function g( ) from the non-local shared library 160.

In yet other scenarios (not shown), the resolver 134 looks up the function g( ) in the table 155 to find (the name of) the function g( ) but recognizes that the function g( ) is not in the shared library 150. The resolver 134 can read the properties 167 for function g( ), and determine that the function (g) is an external symbol that is not reachable by displacement (not reachable by an offset distance used for a pc relative branch). As such, the resolver 134 would execute the instructions of stub 405 for the normal case. In yet other scenarios, a resolver might generate a stub using register indirect far branches and not loading an address table (GOT/TOC) base pointer, might generate stubs based on combinations of properties discussed herein, and/or might generate stubs based on other properties, in accordance with the teachings contained herein.

Figure 7:
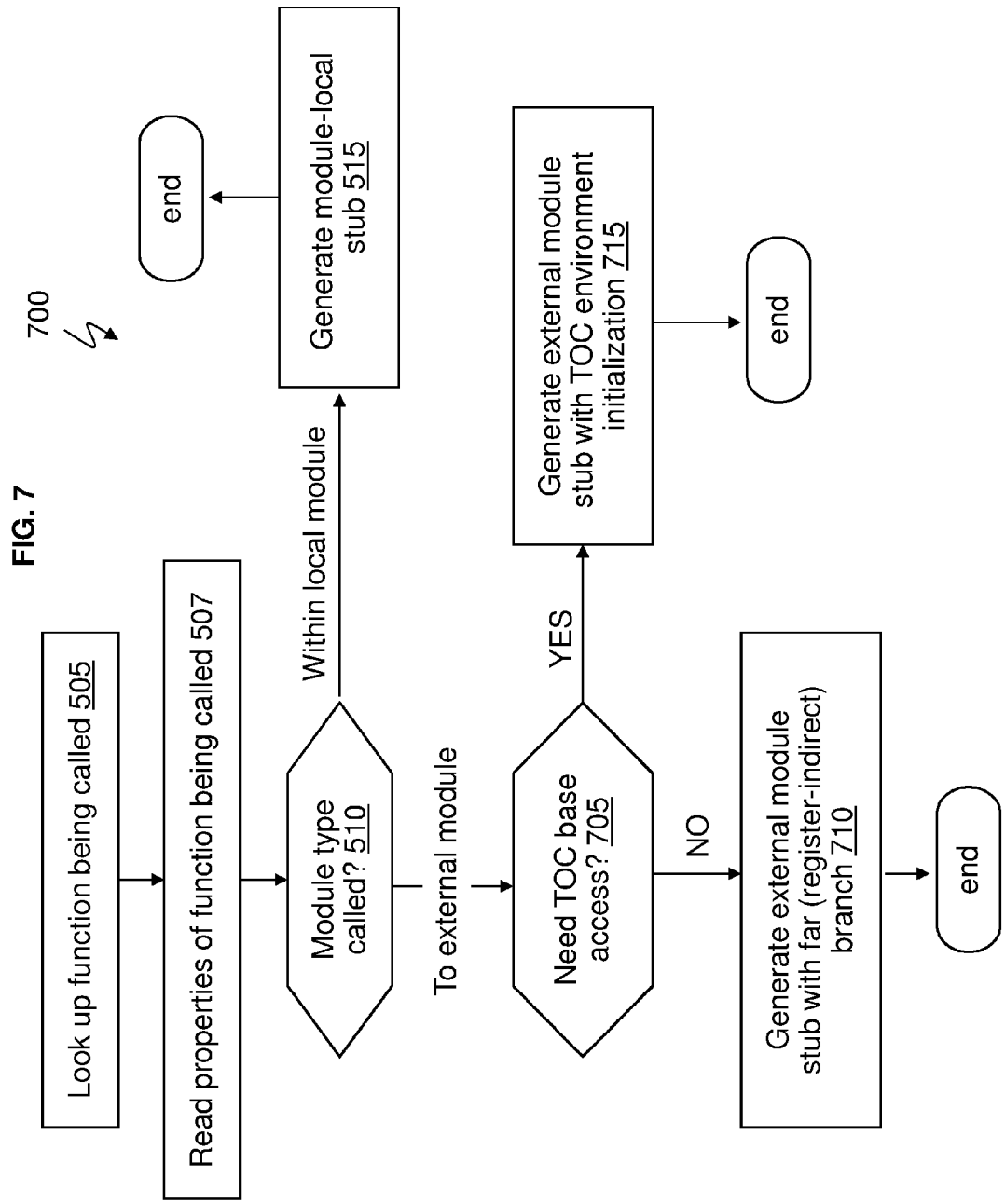
FIG. 7 is a flow chart of a method further tailoring the stub generation based on environment setup/address initialization in accordance with an embodiment.

FIG. 7 is a flow chart of a method 700 (of the resolver 134 running on the processor 105) further tailoring the method 500 based on environment setup/address initialization according to an embodiment. FIG. 7 corresponds to the block diagram 600 in FIG. 6 (which further builds on and optimizes FIG. 4).

The resolver 134 determines one or more stubs to generate during runtime. As discussed above, it is assumed that the resolver 134 has been called to determine and locate a called function g( ) (which can represent any function being called). In a state-of-the art situation, the resolver 134 would follow the instructions in stub 215 or 405, without generating a new stub based on the particular properties of the called function.

The resolver 134 is configured to look up the function g( ) being called (in tables 155 and/or 165) at block 505 and read the properties 157 and/or 167 for this particular function g( ) at block 507. Based on reading the particular properties 157 and/or 167 for the function g( ), the resolver 134 is configured to determine the type (whether local or non-local) of module being called at block 510. When the resolver 134 determines that the module type of the called function g( ) is a local module (which is the same shared library 150 as the calling function f( )), the resolver 134 is configured to generate a local module stub at block 515. This is because environment setup is not needed, and stub 410 is an example of a local module stub generated by the resolver 134.

When the resolver 134 determines that the module type of the function g( ) is an external module (i.e., the shared library 160 of the called function g( ) is different from the shared library 150 of the calling function f( )), the resolver 134 is configured to determine whether the TOC base access is needed (i.e., whether address initialization is needed) for the called function g( ) at block 705. When the resolver 134 determines that address initialization is needed for the called function g( ), the resolver 134 generates the external module stub with TOC environment initialization at block 715. This generates the stub 415. Those skilled in the art will understand that the method 700 can further be enabled with the teachings of method 500, e.g., where block 715 can transfer into a test 520, generating a block with address initialization and using at least one of a local pc-relative and a far register-indirect branch.

When the resolver 134 determines that TOC base access (i.e., address initialization) is not needed, the resolver 134 is configured to generate an external module stub without TOC environment initialization at block 710. As such, this generates the stub 605 with a single instruction that does not require setup of the environment (i.e., no address initialization of tables 159 and/or 169) when a local pc-relative branch can be used. Those skilled in the art will understand that the method 700 can further be enabled with the teachings of method 500, e.g., where block 710 can transfer into a test 520, generating a block without address initialization and using at least one of a local pc-relative and a far register-indirect branch.

Many additional features can be added to the determination and generation of stubs by the resolver 134 based on properties of the called function, where properties are derived from properties 157 and/or 167 or from other means of determining properties in accordance with the present teachings, including, but not limited to, naming conventions, code analysis, and so forth. As provided herein, dynamic code generation by the resolver 134 requires writing code (i.e., stubs) at runtime. To ensure safety, the resolver 134 can communicate with an operating system (OS) kernel 170 to generate and/or update stubs as a trusted operation. Accordingly, any operation performed under the authority of the resolver 134 can be performed by the OS kernel 170.

To prevent attempts to update the same stub by different applications and/or different threads, concurrent update of a stub in multi-threaded environment (e.g., with multiple processor circuitry (cores) 110 and/or one core running multiple threads) is performed such that either an updated stub, or a non-updated stub is visible to another executing thread. In one embodiment, this is accomplished by unmapping the page storing the stub and then performing code (i.e., stub) update when the page is not visible to applications such as the software application 114 and threads. Unmapping the page means that the resolver 134 makes the page of the stub temporarily unavailable, preferably in conjunction with an OS kernel 170, while the stub is being generated (created) and/or updated.

Additionally, concurrent update can be by, e.g., atomic stores where a stub is replaced by performing a store that updates code of the store being executed (e.g., the resolver 134 can replace a long general stub by a simple branch at the beginning of the stub). Also, the resolver 134 can use transactional memory to concurrently update entire stub. Those skilled on the art will identify other means to perform updates from a first stub to a second stub, by using a variety of means of updating stubs, in accordance with the present disclosure.

Figure 8:
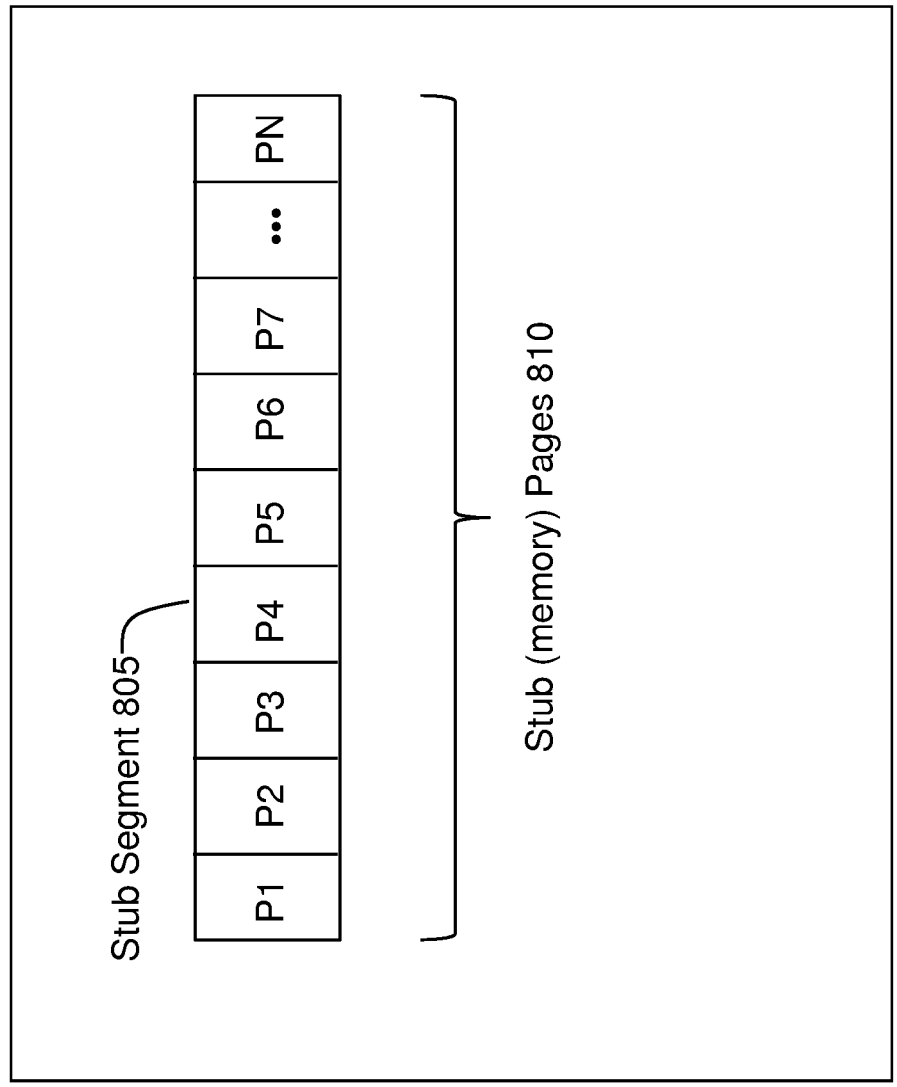
FIG. 8 is a block diagram illustrating additional sections of the memory with a separate stub segment storing the generated stubs in accordance with an embodiment.

As will be discussed with reference to FIGS. 8 and 9, further optimization can be added to the resolver 134. FIG. 8 is a block diagram illustrating additional sections of the memory 120 with a separate stub segment 805 storing the generated stubs according to an embodiment. For example, all of the stubs generated by the resolver 134 may be collected/stored in the separate stub segment 805 that has multiple stub pages 810, or in a separate segment each corresponding to a module. The stub segment or stub segments 805 are predefined address locations of individual stub pages 810 in the memory 120, and the stub segment(s) 805 can be modified by the resolver 134. The pages are configured to use copy on write to update code (i.e., instructions) of a stub for each process (e.g., called function). In addition, the operating system 125 (e.g., the resolver 134) may implement a deduplication process for stub pages 810 having pages P1 through PN. The deduplication process can identify stub pages 810 that can be shared in memory 120 (e.g., without having to store separately multiple copies of stub pages generated using copy-on-write for each process responsive to resolver 134 updating stubs, once stubs have been generated) when the same stub page 810 already exists. For example, the deduplication process is configured to compare generated per-process stub pages with a corresponding stub page of other processes, and share the same stub page(s) between two or more processes. Note that although not shown for conciseness, the memory 120 includes the other elements as discussed in FIG. 1.

Figure 9:
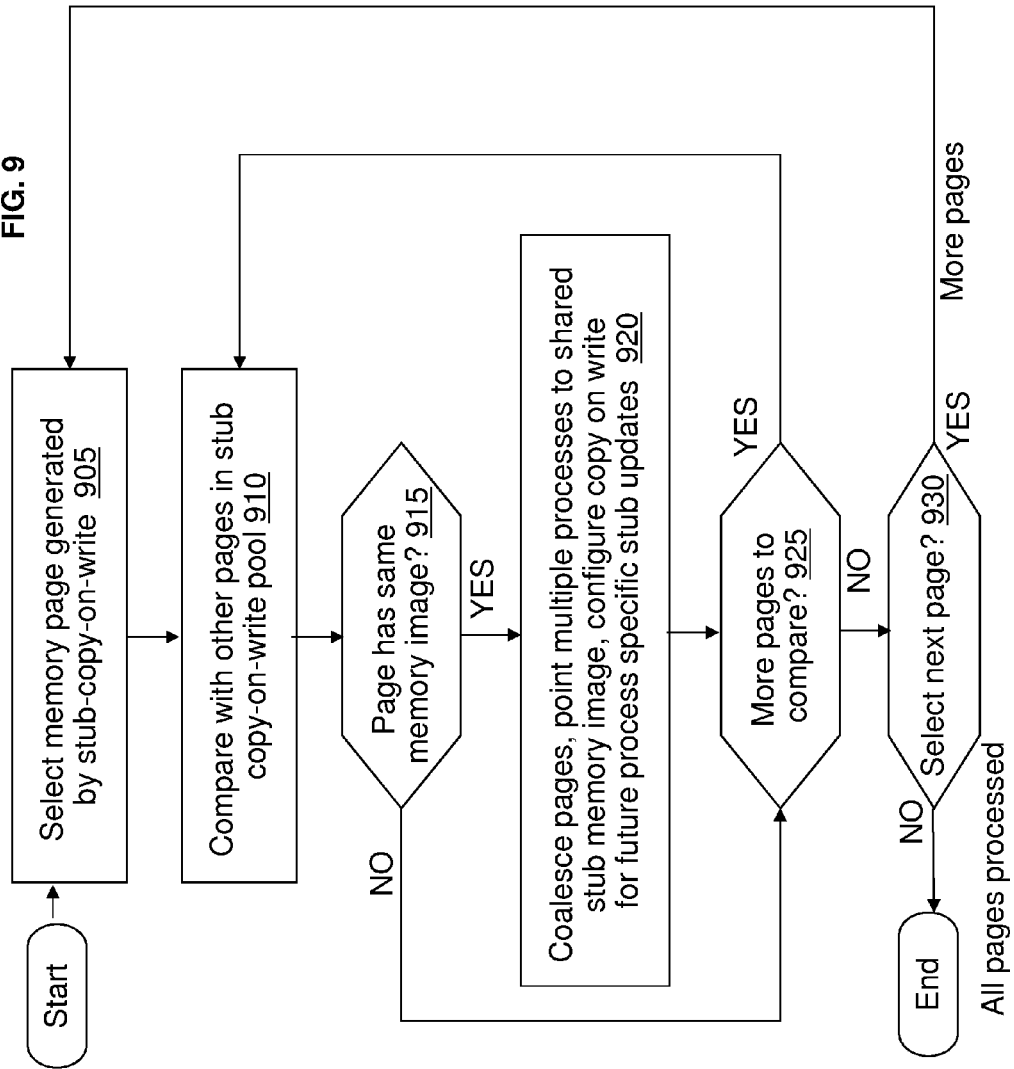
FIG. 9 is flow chart of a method for checking whether (two or more) different applications have generated duplicate stubs, and sharing the private stubs among applications according in accordance with an embodiment.

FIG. 9 is flow chart of a method 900 by a deduplication process (e.g., implemented as by the OS kernel 170) that checks whether (two or more) different applications (such as the software application 114) have generated duplicate stubs, and the deduplication process (e.g., implemented as part of OS kernel 170) can share these private stubs among applications according to an embodiment. Also, the a deduplication process (e.g., implemented as part of OS kernel 170) can remove duplicate stubs.

The deduplication process (e.g., implemented as part of OS kernel 170) implements method 700. Method 700 is configured to select a stub (memory) page generated by a stub-copy-on-write at block 905. This particular stub page may be stub page P1.

Method 700 is configured to compare stub page P1 with other pages (in the stub pages 810) in stub copy-on-write pool at block 910. Method 700 checks whether the page (e.g., stub page P1) has the same memory image (e.g., the same instructions for a particular called function g( )) as at least one of the other stub pages P2-PN of at least one other process. For example, the memory image of stub page P1 can be compared to the memory image of stub page P7. If No the stub page P1 does not have the same memory image as the stub page P7, the flow moves to block 925. If Yes the stub page P1 has the same memory image as the stub page P7, the resolver 134 is configured to coalesce (i.e., merge) the stub pages P1 and P7, point the respective processes (e.g., of the same software application 114 or of two different software applications) to the shared stub memory image which may be at the stub page P1, and configure copy-on-write for these respective processes at block 920.

At block 925, method 700 is configured to check whether there are more pages to compare to the stub page P1. If Yes there are more stub pages 810 that need to be compared to the stub page P1, the flow returns to block 910. If No there are no more stub pages 810 that need to be compared with the stub page P1, method 700 is configured to check whether the next stub page, e.g., stub page P2, needs to be compared against other stub pages 810 at block 930. If there is a next stub page such as stub page P2, the flow returns to block 905. If all of the stub pages 810 (e.g., stub pages P1-PN) have been processed for duplicates, the process ends.

In accordance with one embodiment, the number of pages compared can be reduced by comparing only like pages, e.g., those where the pages are derived from a common module loaded into different processes, from a common position in the stub segment of a common module, and so forth.

Figure 10:
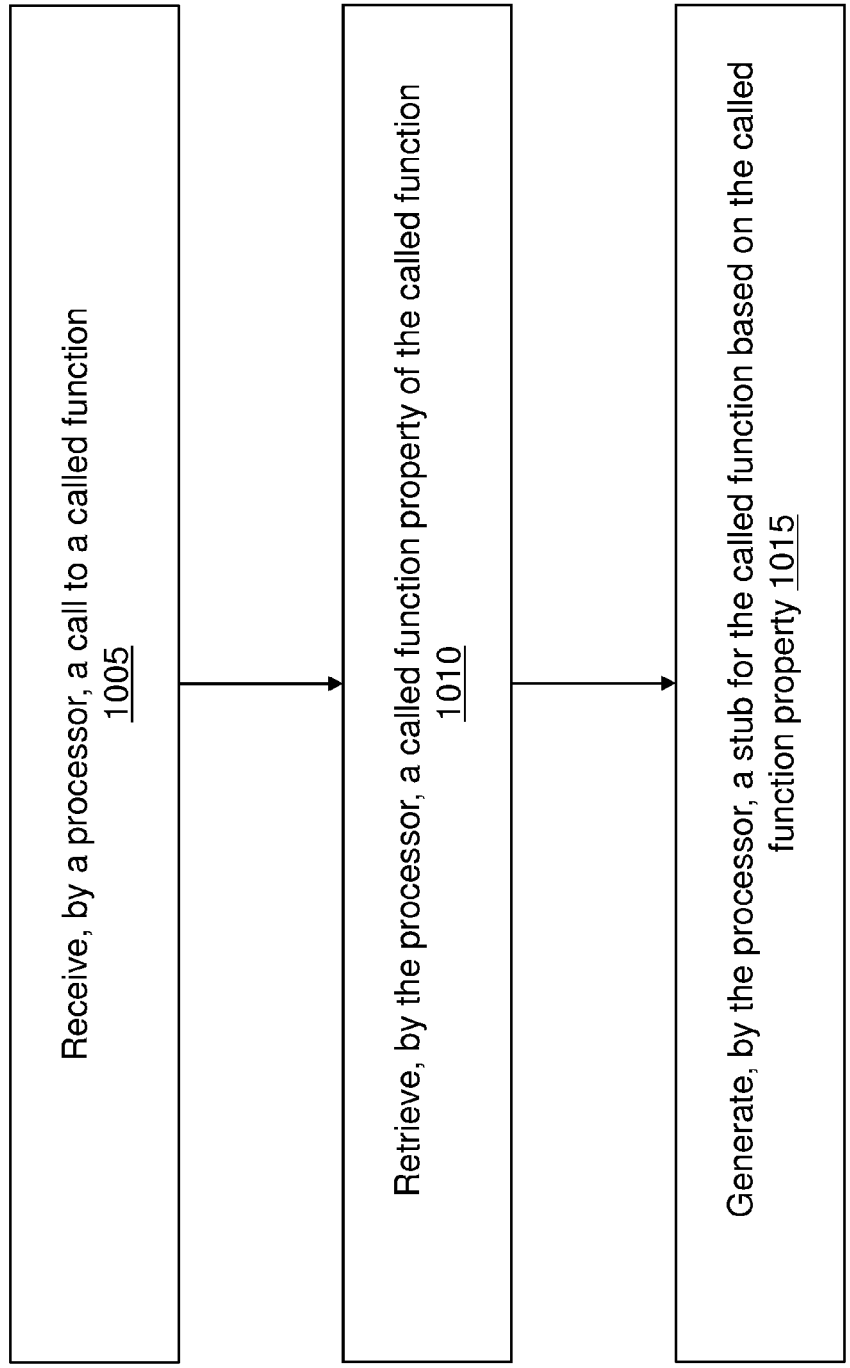
FIG. 10 is a flow chart of a method for generating stubs based on properties of the called functions in accordance with an embodiment.

FIG. 10 is a flow chart of a method 1000 for generating stubs by the resolver 134 (running on the processor 105) based on properties of the called functions according to an embodiment. Reference can be made to FIGS. 1-9. Various examples describe the resolver 134 (executing on the processor 105) performing various operations for explanation purposes. It is contemplated and understood that the functions and operations of the resolver 134 can be performed by the dynamic linker 130 and the operating system 125 (such as an operating system service via the kernel 170).

The resolver 134 is configured to receive a call to a called function (e.g., called function g( )) from a calling function (e.g., calling function f( ) at block 1005.

The resolver 134 is configured to retrieve a called function property (e.g., properties 157 and/or 167 of the called function g( )) of the called function at block 1010.

The resolver 134 is configured to generate a stub (such as the generated stubs discussed in FIGS. 4, 5, 6, and 7) for the called function based on the called function property (i.e., properties 157 and/or 167 of the called function g( )) at block 1015.

Further, the resolver 134 is configured to determine when the called function g( ) and the calling function f( ) are together in a shared library 150 (which is the local module). Also, in another case, the resolver 134 is configured determine when the called function g( ) is in another shared library 160, where the other shared library 160 is external to the shared library 150.

The resolver 134 is configured to optimize instructions in the stub based on the called function g( ) being in the shared library 150 with the calling function f( ) and the resolver 134 is configured to optimize instructions in the stub based on the call function g( ) being in the other non-local shared library 160 (i.e., being in an external module).

The resolver 134 is configured to optimize instructions in the stub based on a near call distance (responsive to determining that the called function g( ) is reachable with a memory address offset/displacement from branch, e.g., in a stub used by the calling function f( ) (i.e., the called function g( ) in shared library 160 is not far away from the location (in memory 120) of the branch, e.g., in a stub used by the calling function f( ) in shared library 150). The near call distance does not require full 64 address bits but can be reached by a limited number of address bits (e.g., 16 bits) which indicate an offset distance. Additionally, the resolver 134 is configured to optimize the stub based on a far call distance responsive to determining that the called function g( ) requires more address bits than provided in the near call distance. The far call distance requires the full 64 address bits.

Further, the stub can be generated by an operating system service via the kernel 170. The resolver 134 is configured to update the stub with an atomic update to create an updated stub. The atomic update to create the updated stub includes updating the updated stub (i.e., updating the memory image) while a stub memory page (such as the stub page P1) is unmapped from an executing address space of a thread, and using an atomic store to store the updated stub in stub page P1.

The resolver 134 is configured to store the stub in a separate stub segment 805 with copy on write characteristics between multiple threads executing a shared library 150/160 and to coalesce/merge multiple stubs (e.g., being stored in multiple stub (memory) pages 910) in order to remove duplicates.

Figure 11:
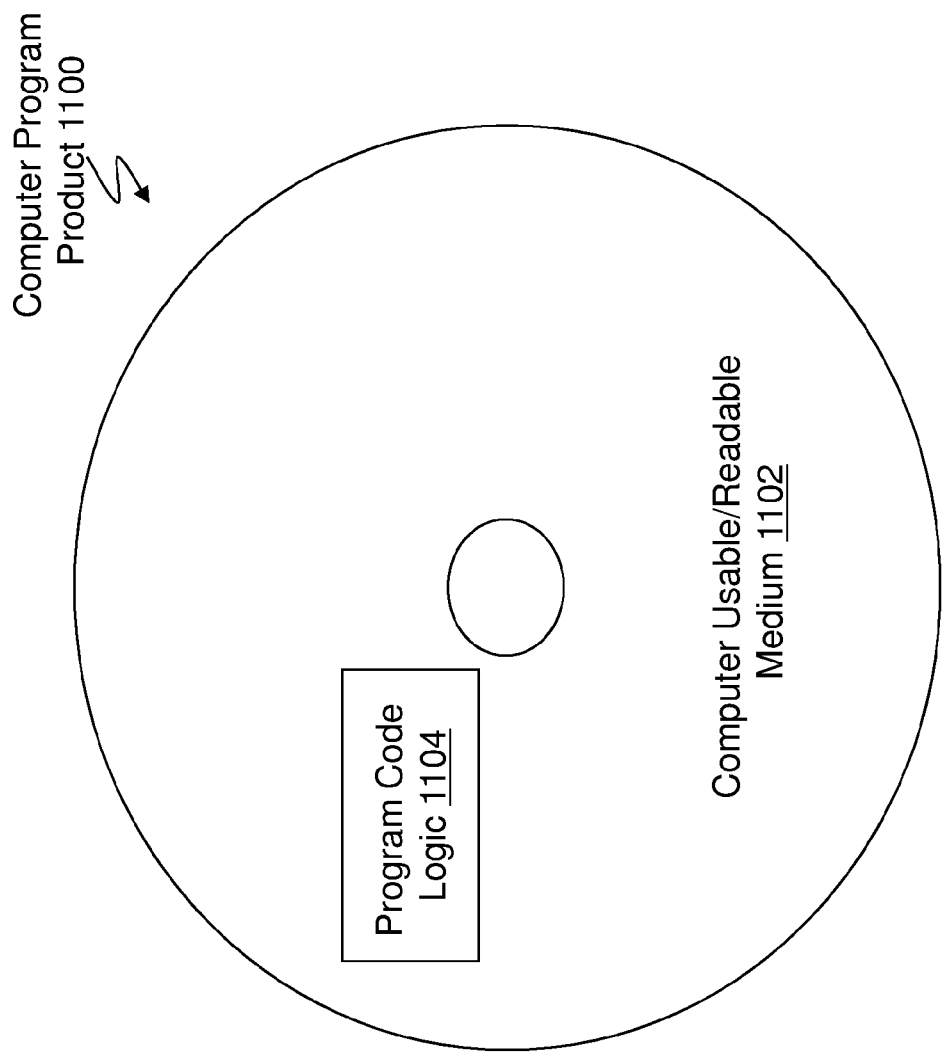
FIG. 11 illustrates a computer program product in accordance with an embodiment.

As described above, embodiments can be embodied in the form of computer-implemented processes and apparatuses for practicing those processes. An embodiment may include a computer program product 1100 as depicted in FIG. 11 on a computer readable/usable medium 1102 with computer program code logic 1104 containing instructions embodied in tangible media as an article of manufacture. Exemplary articles of manufacture for computer readable/usable medium 1102 may include floppy diskettes, CD-ROMs, hard drives, universal serial bus (USB) flash drives, or any other computer-readable storage medium, wherein, when the computer program code logic 1104 is loaded into and executed by a computer, the computer becomes an apparatus for practicing the invention. Embodiments include computer program code logic 1104, for example, whether stored in a storage medium, loaded into and/or executed by a computer, or transmitted over some transmission medium, such as over electrical wiring or cabling, through fiber optics, or via electromagnetic radiation, wherein, when the computer program code logic 1104 is loaded into and executed by a computer, the computer becomes an apparatus for practicing the invention. When implemented on a general-purpose microprocessor, the computer program code logic 1104 segments configure the microprocessor to create specific logic circuits.

Figure 12:
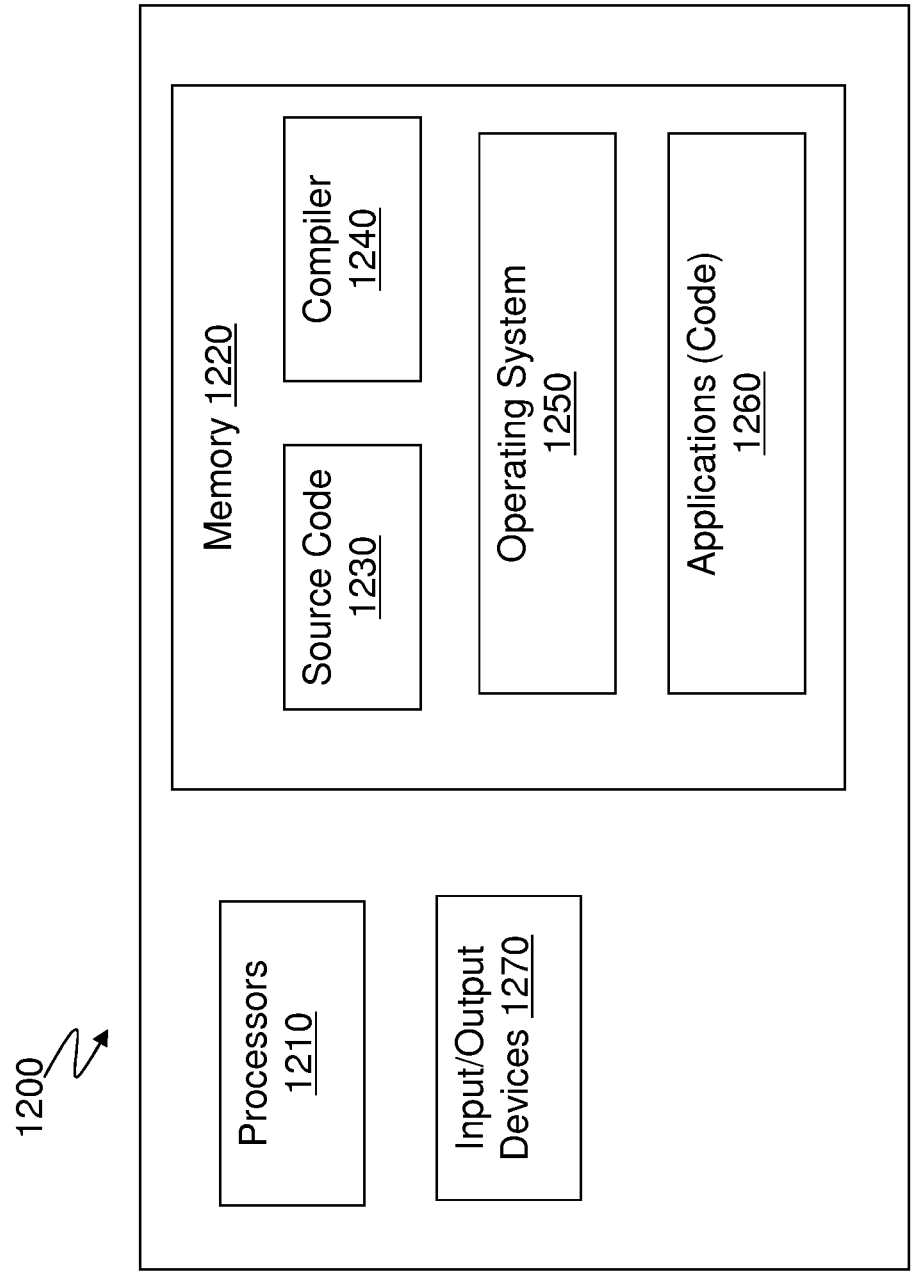
FIG. 12 illustrates an example of a computer having capabilities, which may be included in exemplary embodiments.

FIG. 12 illustrates an example of a computer 1200 having capabilities, which may be included in exemplary embodiments. Various methods, procedures, modules, flow diagrams, tools, applications, circuits, elements, and techniques discussed herein may also incorporate and/or utilize the capabilities of the computer 1200. Moreover, capabilities of the computer 1200 may be utilized to implement features of exemplary embodiments discussed herein. One or more of the capabilities of the computer 1200 may be utilized to implement, to connect to, and/or to support any element discussed herein (as understood by one skilled in the art) in FIGS. 1-11.

Generally, in terms of hardware architecture, the computer 1200 may include one or more processors 1210, computer readable storage memory 1220, and one or more input and/or output (I/O) devices 1270 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1210 is a hardware device for executing software that can be stored in the memory 1220. The processor 1210 can be virtually any custom made or commercially available processor, a central processing unit (CPU), a data signal processor (DSP), or an auxiliary processor among several processors associated with the computer 1200, and the processor 1210 may be a semiconductor based microprocessor (in the form of a microchip) or a macroprocessor.

The computer readable memory 1220 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1220 may incorporate electronic, magnetic, optical, and/or other types of storage media. Note that the memory 1220 can have a distributed architecture, where various components are situated remote from one another, but can be accessed by the processor 1210.

The software in the computer readable memory 1220 may include one or more separate programs, each of which comprises an ordered listing of executable instructions for implementing logical functions. The software in the memory 1220 includes a suitable operating system (O/S) 1250, compiler 1240, source code 1230, and one or more applications 1260 of the exemplary embodiments. As illustrated, the application 1260 comprises numerous functional components for implementing the features, processes, methods, functions, and operations of the exemplary embodiments. The application 1260 of the computer 1200 may represent numerous applications, agents, software components, modules, interfaces, controllers, etc., as discussed herein but the application 1260 is not meant to be a limitation.

The operating system 1250 may control the execution of other computer programs, and provides scheduling, input-output control, file and data management, memory management, and communication control and related services.

The application(s) 1260 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 1260 may be a source program, executable program (object code), script, or any other entity comprising a set of instructions to be performed. When a source program, then the program is usually translated via a compiler (such as the compiler 1240), assembler, interpreter, or the like, which may or may not be included within the memory 1220, so as to operate properly in connection with the O/S 1250. Furthermore, the application 1260 can be written as (a) an object oriented programming language, which has classes of data and methods, or (b) a procedure programming language, which has routines, subroutines, and/or functions.

The I/O devices 1270 may include input devices (or peripherals) such as, for example but not limited to, a mouse, keyboard, scanner, microphone, camera, etc. Furthermore, the I/O devices 1270 may also include output devices (or peripherals), for example but not limited to, a printer, display, etc. Finally, the I/O devices 1270 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1270 also include components for communicating over various networks, such as the Internet or an intranet. The I/O devices 1270 may be connected to and/or communicate with the processor 1210 utilizing Bluetooth connections and cables (via, e.g., Universal Serial Bus (USB) ports, serial ports, parallel ports, FireWire, HDMI (High-Definition Multimedia Interface), etc.).

When the computer 1200 is in operation, the processor 1210 is configured to execute software stored within the memory 1220, to communicate data to and from the memory 1220, and to generally control operations of the computer 1200 pursuant to the software. The application 1260 and the O/S 1250 are read, in whole or in part, by the processor 1210, perhaps buffered within the processor 1210, and then executed.

When the application 1260 is implemented in software it should be noted that the application 1260 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 1260 can be embodied in any computer-readable medium 1220 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 1220 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical).

In exemplary embodiments, where the application 1260 is implemented in hardware, the application 1260 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 1200 includes non-limiting examples of software and hardware components that may be included in various devices, servers, and systems discussed herein, and it is understood that additional software and hardware components may be included in the various devices and systems discussed in exemplary embodiments.

Technical effects and benefits include reducing the time and processing resources for stubs by generating tailored stubs based on the properties of the called function instead of using a generic stub for all called functions. This allows for secure runtime optimization of external module subroutine calls based on called function properties (such as architecture levels) ability to call a subroutine with a near (short displacement branch), and location of a target subroutine in a module.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for generating stubs, the method comprising:
   receiving, by a processing circuit, a call to a called function;
   retrieving, by the processing circuit, a called function property of the called function;
   generating, by the processing circuit, a stub for the called function based on the called function property;
   optimizing instructions in the stub based on a near call distance responsive to determining that the called function is reachable with a memory address offset from a branch in the stub, wherein the near call distance does not require full address bits; and
   optimizing the stub based on a far call distance responsive to determining that the called function requires more address bits than provided in the near call distance, wherein the far call distance requires the full address bits.

2. The computer implemented method of claim 1, further comprising:
   determining that the called function and a calling function are together in a shared library; or determining that the called function is in another shared library, the another shared library being external to the shared library.

3. The computer implemented method of claim 2, further comprising optimizing instructions in the stub based on the called function being in the shared library with the calling function.

4. The computer implemented method of claim 2, further comprising optimizing instructions in the stub based on the called function being in the another shared library.

5. The computer implemented method of claim 1, wherein the stub is generated by an operating system service.

6. The computer implemented method of claim 1, further comprising updating the stub with an atomic update to create an updated stub;
   wherein the atomic update to create the updated stub comprises at least one of:
   updating the updated stub while a memory page of the stub is unmapped from an executing address space of a thread, and using an atomic store to store the updated stub.

7. A computer program product for generating stubs, the computer program product comprising:
   a non-transitory storage medium readable by a processing circuit and storing instructions for execution by the processing circuit for performing a method comprising:
   receiving, by the processing circuit, a call to a called function;
   retrieving, by the processing circuit, a called function property of the called function;
   generating, by the processing circuit, a stub for the called function based on the called function property;
   optimizing instructions in the stub based on a near call distance responsive to determining that the called function is reachable with a memory address offset from a branch in the stub, wherein the near call distance does not require full address bits; and
   optimizing the stub based on a far call distance responsive to determining that the called function requires more address bits than provided in the near call distance, wherein the far call distance requires the full address bits.

8. The computer program product of claim 7, wherein the method further comprises determining that the called function and a calling function are together in a shared library; or
   determining that the called function is in another shared library, the another shared library being external to the shared library.

9. The computer program product of claim 8, wherein the method further comprises optimizing instructions in the stub based on the called function being in the shared library with the calling function.

10. The computer program product of claim 8, wherein the method further comprises optimizing instructions in the stub based on the called function being in the another shared library.

11. The computer program product of claim 7, wherein the stub is generated by an operating system service.

12. The computer program product of claim 7, wherein the method further comprises:
    updating the stub with an atomic update to create an updated stub, wherein the atomic update to create the updated stub comprises at least one of:
    updating the updated stub while a memory page of the stub is unmapped from an executing address space of a thread; and
    using an atomic store to store the updated stub.

13. The computer program product of claim 7, wherein the method further comprises:
    storing the stub in a separate segment with copy on write characteristics between multiple processes executing a shared library; and
    coalescing a plurality of stubs in order to remove duplicates.

* * * * *